United States Patent
Cooper

(10) Patent No.: US 10,534,743 B2
(45) Date of Patent: Jan. 14, 2020

(54) METHOD AND APPARATUS FOR PROVIDING PERFORMANCE DATA OVER A DEBUG BUS

(71) Applicant: Advanced Micro Devices, Inc., Sunnyvale, CA (US)

(72) Inventor: Elizabeth Morrow Cooper, Los Gatos, CA (US)

(73) Assignee: Advanced Micro Devices, Inc., Santa Clara, CA (US)

(*) Notice: Subject to any disclaimer, the term of this patent is extended or adjusted under 35 U.S.C. 154(b) by 328 days.

(21) Appl. No.: 14/516,171

(22) Filed: Oct. 16, 2014

(65) Prior Publication Data

US 2015/0120970 A1    Apr. 30, 2015

Related U.S. Application Data

(60) Provisional application No. 61/897,702, filed on Oct. 30, 2013.

(51) Int. Cl.
| | | |
|---|---|---|
| G06F 13/42 | (2006.01) | |
| G06F 11/34 | (2006.01) | |
| G06F 3/06  | (2006.01) | |

(52) U.S. Cl.
CPC ........ *G06F 13/4221* (2013.01); *G06F 11/348* (2013.01); *G06F 2201/88* (2013.01)

(58) Field of Classification Search
None
See application file for complete search history.

(56) References Cited

U.S. PATENT DOCUMENTS

| | | | | |
|---|---|---|---|---|
| 2003/0046522 | A1* | 3/2003  | Ehmann  | G06F 11/349 713/1 |
| 2007/0083865 | A1* | 4/2007  | Hemmi   | G06F 9/462 718/100 |
| 2009/0307697 | A1* | 12/2009 | Hurley  | G06F 9/4881 718/102 |
| 2011/0219208 | A1* | 9/2011  | Asaad   | G06F 15/76 712/12 |
| 2014/0013020 | A1* | 1/2014  | Horsnell | G06F 13/24 710/260 |

\* cited by examiner

*Primary Examiner* — Scott C Sun
(74) *Attorney, Agent, or Firm* — Faegre Baker Daniels LLP

(57) ABSTRACT

A device and method for providing performance information about a processing device. A stream of performance data is generated by one or more devices whose performance is reflected in the performance data. This performance data stream is then provided to a parallel port for outputting thereof.

22 Claims, 4 Drawing Sheets

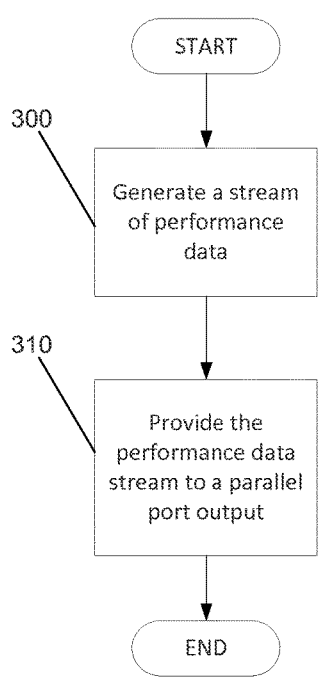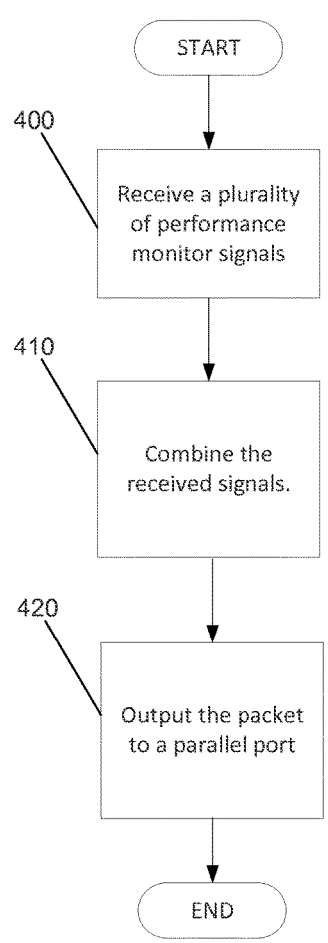
FIG. 3
FIG. 4

METHOD AND APPARATUS FOR PROVIDING PERFORMANCE DATA OVER A DEBUG BUS

PRIORITY

The present application is a non-provisional application of U.S. Provisional Application Ser. No. 61/897,702, titled METHOD AND APPARATUS FOR PROVIDING PERFORMANCE DATA OVER A DEBUG BUS, filed Oct. 30, 2013, the disclosure of which is hereby expressly incorporated by reference and the priority of which is hereby claimed.

FIELD OF THE DISCLOSURE

The present disclosure is related to methods and devices for gathering performance data for computing hardware. The present disclosure is more specifically related to methods and devices for gathering performance data where such gathering has a reduced impact on the performance data being gathered.

BACKGROUND

In computing, increased performance is generally desirable. Increased performance is often provided via increased costs of the materials used. However, increased performance can also be achieved through more efficient use of materials. Efficient use of materials has the added benefit of usually having a lower marginal cost to achieve performance relative to sinking resources into the materials/hardware cost as mentioned.

To facilitate efficient use of hardware, operations on computing platforms are measured and monitored. Performance data for processors is needed for users that wish to monitor and enhance the performance of the system as it is executing software. Many hardware devices have built in performance monitoring capabilities. Indeed, many processors have hardware performance counters in multiple places on the chip. Performance monitors are often configured to look for and count certain operations that are relevant to performance. At this point, the performance data is captured in counters but still within the computing system and not yet available to be acquired and considered by a user. When the performance counters are full, an interrupt is generated such that the computing system can retrieve the data and clear the counter to be able to collect more data. An interrupt is a signal to the processor emitted by hardware or software indicating an event that needs immediate attention. An interrupt alerts the processor to a high-priority condition requiring the interruption of the current code the processor is executing (thread). The processor responds by suspending its current activities, saving its state, and executing a small program called an interrupt handler (or interrupt service routine, ISR) to deal with the event. This interruption is temporary, and after the interrupt handler finishes, the processor resumes execution of the previous thread. The interrupt allows performance counter data to be output on a set of breakpoint pins which are often a serial bus. Such interrupts are handled one at a time (serially) for each hardware block that has such a counter.

The retrieved data is then stored in a file on non-volatile memory for later retrieval by a user. The generation of an interrupt, as its name implies, interrupts operation of the computing entity to allow the retrieval of the performance data. Such interruption, necessarily impacts the performance of the operations that was interrupted. Thus, the very fact that performance is measured necessarily alters the underlying process being measured. In certain circles, this effect is referred to as an "observer effect." Accordingly, what is needed is a way to measure performance that lessens, minimizes, or eliminates the observer effect in performance monitoring for computing operations.

BRIEF DESCRIPTION OF THE DRAWINGS

FIG. 3 is a flowchart showing operation of the system of FIG. 1 according to another embodiment of the present disclosure;

FIG. 4 is a flowchart showing operation of the system of FIG. 1 according to yet another embodiment of the present disclosure.

DETAILED DESCRIPTION OF EMBODIMENTS

In an exemplary and non-limited embodiment, aspects of the invention are embodied in a method of providing performance information about a processing device. A stream of performance data is generated by one or more devices whose performance is reflected in the performance data. This performance data stream is then provided to a parallel port for outputting thereof.

In another example, a method of generating a stream of performance monitor data is provided including: receiving a plurality of performance monitor signals; combining the received performance monitor signals into a packet; and outputting the packet to a parallel port.

In another example, a performance monitoring system is provided including: at least one source of system performance data; a debug bus operable to receive and transport packets containing performance data; and a parallel port coupled to the debug bus such that data streamed on the debug bus is provided to the parallel port.

In still another example, a computer readable medium is provided that contains non-transitory instructions thereon, that when interpreted by at least one processor cause the at least one processor to generate a stream of performance data by one or more devices whose performance is reflected in the performance data, and provide the performance data stream to a parallel port output.

In another example, a data capture device is provided including: a parallel port input operable to receive data streamed from a parallel port of a computing device; and a performance data extractor operable to extract performance data from a data stream received via the parallel port input.

In another example, a method of outputting processor performance data is provided including: executing a set of instructions on a processor; monitoring the operation of the processor as the instructions are executed; outputting data regarding the performance of the processor while the instructions are being executed; wherein the outputting allows the processor to continuously execute the instructions during the outputting.

Figure 1:
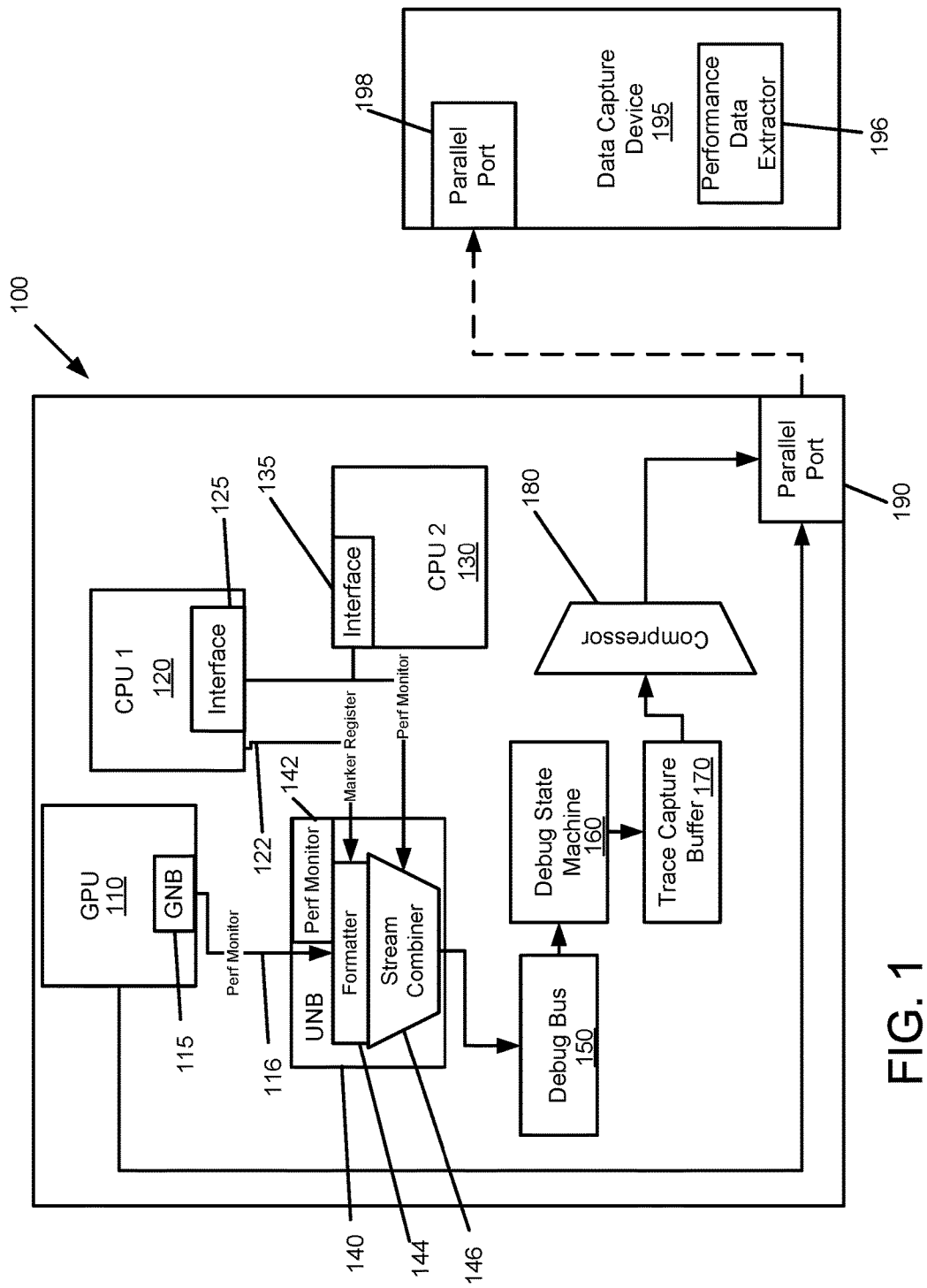
FIG. 1 is a diagram showing exemplary architecture of a system employing performance monitor outputting according to an embodiment of the present disclosure.
Figure 2:
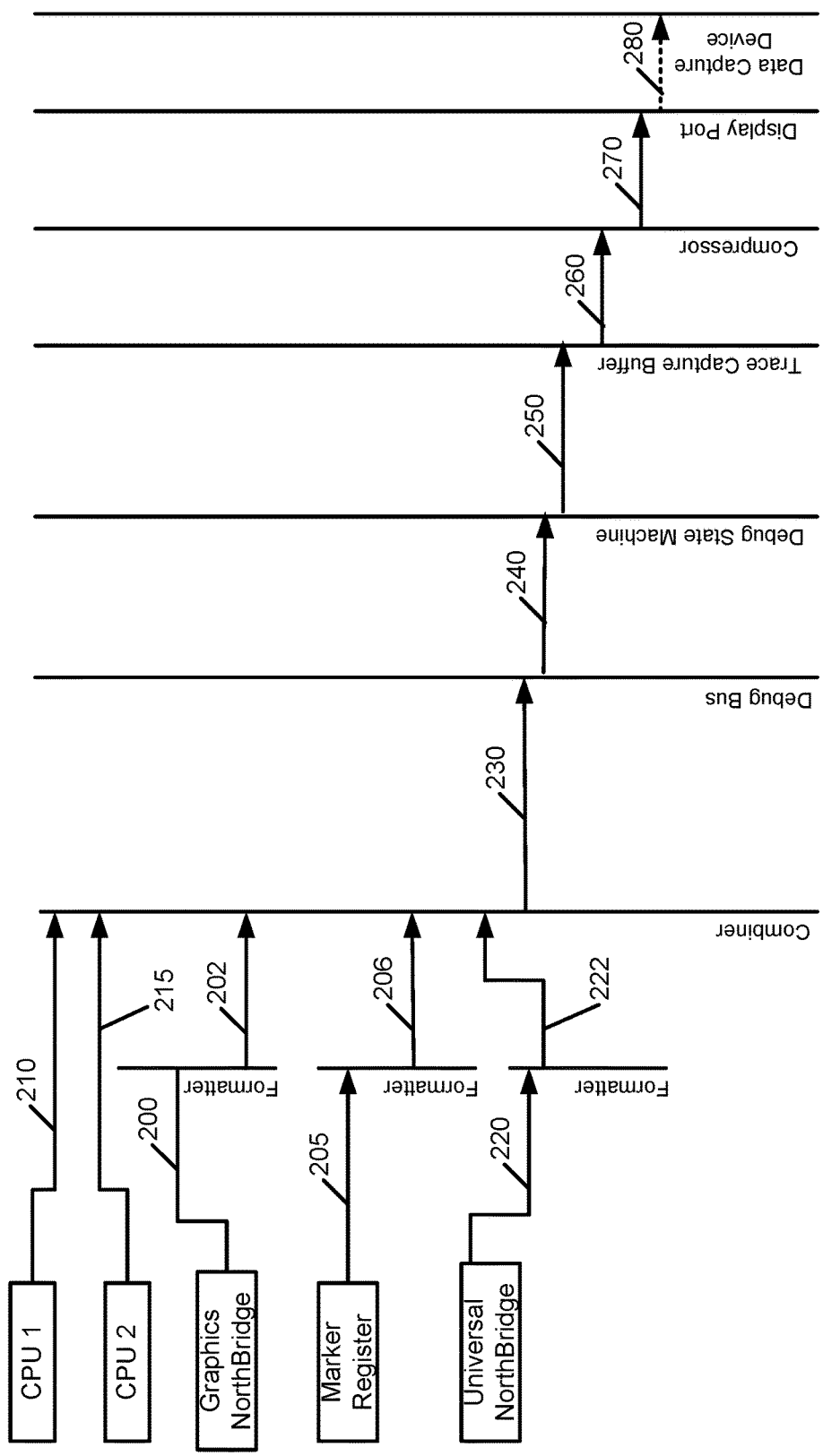
FIG. 2 is a diagram showing signals of the system of FIG. 1 according to one embodiment of the present disclosure.
Figure 5:
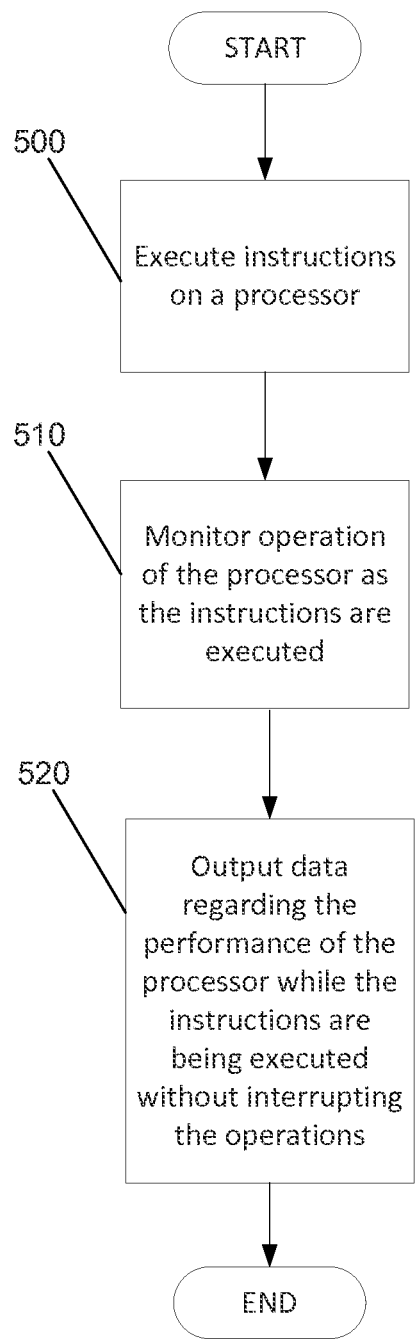
FIG. 5 is a flowchart showing operation of the system of FIG. 1 according to yet another embodiment of the present disclosure.

FIG. 1 shows a computing system 100 that includes multiple processors 110, 120, 130, universal northbridge (UNB) 140, debug bus 150, debug state machine 160, trace capture buffer 170, compressor 180, and display port 190. Processor 110 is a graphics processing unit (GPU) that includes graphics northbridge (GNB) 115.

GNB 115 is operative to generate and output performance monitoring data 200 therefrom in a stream to UNB 140, block 300. To test performance of a processor, system, or other device, operations are started by having the processor execute instructions, block 500. Performance monitoring data is provided on a debug bus 116 to monitor operations of the processor as the instructions are executed, block 510. The width of debug bus 116 of GNB 115 is 64 bits wide in the exemplary embodiment. Debug bus 116 of GNB 115 uses the lower thirty-two bits for capturing performance monitoring data (GN_DebugBus[31:0]). A 1 bit valid bit (GN_DebugBusVal) and a 1 bit start bit (GN_DebugBusStart) are also utilized. The thirty-two captured bits are placed on the debug bus 116, sixteen bits at a time, in back-to-back cycles. In a first cycle, DebugBus[63:48]= GN_DebugBus[15:0]; DebugBus[GnbDataValid]=1; DebugBus[GnbDataStart]=GN_DebugBusStart. In a second cycle DebugBus[63:48]=stored GN_DebugBus[31:16]; DebugBus[GnbDataValid]=1; DebugBus[GnbDataStart]=0. In the present embodiment, the normal condition results that GNB 115 runs at approximately half of the frequency of UNB 140 so that the quickest data can arrive is approximately every other cycle. Occasionally, data may arrive at UNB 140 in back to back clock cycles of UNB 140. In order to handle such a case, a domain crossing between GNB 115 and UNB 140 is implemented using a domain crossing widget which is backpressured by UNB 140 when UNB 140 is busy processing previous data from GNB 115. Furthermore, GNB 115 is instructed to only send data that UNB 140 can capture. The data is sent as a stream. Streaming as the term is used herein describes a technique for transferring data so that it can be processed as a steady and continuous stream. The streaming discussed herein further provides that the data is transferred as it is generated.

Processor 120 is a general purpose processor that includes debug bus 122 operatively coupled to UNB 140 and a CPU interface 125 also operatively coupled to UNB 140. A marker register is supplied to debug bus 122. The marker register is a special purpose register that can be written by any processor. Accordingly, while marker register is shown as being output by processor 120, embodiments are envisioned where the marker register is output by other processors (such as processor 130). Marker register writes are cyclically generated and detected by processor 120. When the marker register write is detected, thirty-two bits of data 210 are placed on debug bus 122. The data is placed eight bits at a time in four (4) back-to-back cycles (DebugBus [15:8]). The first cycle receives {1pb1, MarkerTimer[6:0]}. MarkerTimer[9:0] is a free-running counter, incremented every four clock cycles with a reset value of 0. The second cycle receives {1'b0, MarkerData[0], CoreId[2:0], and MarkerTimer[9:7]}. MarkerData[14:0] is bits [14:0] of the data that was written into the marker register. CoreId[2:0] is an encoded ID of the core which wrote the marker register. The third cycle receives {1'b0, MarkerData [7:1]}. The fourth cycle receives {1'b0, MarkerData[14:8]}. As previously noted, marker data is placed on the debug bus 122 when a marker register write is detected. In cycles when there is no valid marker data supplied, 0's are driven on the debug bus bits (DebugBus[15:8])

CPU interface 125 is provided with and is operative to output performance monitor data regarding processor 120. In the present embodiment, CPU interface 125 operates using AMD's Common Core Interface. In the present example, there is one set of performance signals per CCI regardless of the number of cores within processor 120. In the present exemplary embodiment, the performance signal 205 supplied by CPU interface 125 takes the form of 16b data (CPU_SpmDbgData[15:0]), 1b valid (CPU_SpmDbgValid); and 1b start (CPU_SpmDbgStart). Additionally, within this data stream, an additional (applications specific) packet structure is implemented. This signal is supplied to UNB 140. However, UNB 140 is not aware of this packet and does not interpret it. UNB 140 merely passes on the data as described below.

Processor 130 operates similarly to processor 120 and includes CPU interface 135. The significant difference between processor 120 and processor 130 is that processor 120 provides marker register. However, as noted, the marker register may be provided by either processor 120 or processor 130. Processor 130 outputs performance data 215.

UNB 140 includes performance monitor 142, formatter 144, and stream combiner 146. Performance monitor 142 generates performance monitoring data 220 regarding UNB 140. In the present embodiment, performance monitor 142 includes four performance registers. The four performance register values are output to debug bus 150 upon the detection of either of two conditions. The first condition involves a Match/Mask register and a count register established in UNB 140. The first condition is satisfied when a certain number of reference clock cycles having a constant frequency clock have occurred. In one embodiment, a match of this type is detected on the rising edge of the ((Match/Mask & Global Time Stamp Counter (GTSC))==(Match/Mask & Count)). The lower 4 bits of the Match/Mask register are hard-wired to 0's. Effectively, this provides that matches are detected on units of 16 GTSC granularity. A second condition involves a simple counter added within UNB 140 that counts clock ticks. It should be appreciated that the clock ticks of UNB 140 can vary in frequency. When the count reaches the limit in a sample register a match is detected. The Sample Period is provided in units of 64 clock ticks granularity. A control bit in the sample register is able to select between the two match criteria to determine which controls.

When a match is detected the lower sixteen bits of all four UNB performance monitors 142 are captured and sent to formatter 144. Formatter 144 provides that the captured data is placed onto debug bus 150, two bits at a time, in back-to-back cycles until all data has been sent, signal 222. In the present exemplary embodiment, the data is placed on debug bus 150 as follows:

Cycle N: {2'b11}
Cycle N+1: Cnt[1:0]
Cycle N+2: {PerfMon0[1:0]}
Cycle N+3: {PerfMon0[3:2]}
. . .
Cycle N+9: {PerfMon0[15:14]}
Cycle N+10: {PerfMon1[1:0]}
. . .
Cycle N+17: {PerfMon1[15:14]}
Cycle N+18: {PerfMon2[1:0]}
. . .
Cycle N+25: {PerfMon2[15:14]}
Cycle N+26: {PerfMon3[1:0]}
. . .
Cycle N+33: {PerfMon3[15:14]}

The Cnt[1:0] value comes from a 2-bit counter which is incremented at the start of sending a new set of performance monitor data. In cycles where there is no valid performance data, 0's are driven on these debug bus bits (DebugBus[1:0]).

As previously discussed, UNB 140 has four performance monitor data sources (three external from processors 110, 120, 130, and one internal), block 400. Formatter 144 receives the performance monitor data from processor 110, receives marker register data from processor 120, and receives performance monitor data from UNB 140. Formatter 144 places the performance monitor data from processor (GNB) 110 and UNB 140 into an expected format, 202, 222, suitable for debug bus 150. Marker register data is likewise formatted, 206, to be readily combinable with the performance monitoring data. The data received over CPU interface (125, 135) from processor 120 and processor 130 needs no re-formatting and thus is supplied stream combiner 146 as it arrives. The valid and start bits of the performance data from processor 120 and processor 130 are put in the control byte, while the data goes in the appropriate data lane, discussed below.

Stream combiner 146 takes streaming data from the four performance monitor streams and the marker register data and combines it into a single stream 230 that is output to debug bus 150, block 410. In the exemplary embodiment, the combined streams are allocated on the 64 bit wide debug bus 150 as follows:

[7:0] Control Byte
[15:8]: Marker data
[31:16]: processor 120 data (16 bits, data lane)
[47:32]: processor 130 data (16 bits, data lane)
[63:48]: processor 110 (GPU) data (16 bits, data lane)

Furthermore, the bits within the control byte are:

[7]: Processor 120 data valid
[6]: processor 120 data start
[5]: processor 130 data valid
[4]: processor 130 data start
[3]: processor 110 data valid
[2]: processor 110 data start
[1:0]: UNB 140 PerfMon Data [1:0]

Data output to debug bus 150 is routed through debug state machine 160, stream 240 inbound and stream 250 outbound, and into trace capture buffer (TCB) 170, which is conventional operation for debug busses 150, debug state machines 160 and trace capture buffers 170. The data is then captured in TCB records in TCB 170. Trace capture buffer records provide a detailed, historical account of application code execution, timing, and data accesses. Trace functionality works in real-time and does not impact the execution of the system. In the exemplary embodiment, TCB 170 is an on-chip circular memory buffer where compressed trace information is stored. The size of the buffer depends on the chip implementation. Typical sizes are between 2-8k. TCB 170 operates as a circular buffer, continuously capturing trace information.

TCB records are then read out of TCB 170 and sent to a Displayport interface 190 via streams 260, 270, block 310, 420. It should be appreciated that while the present embodiment supplies TCB records to DisplayPort interface 190, embodiments are envisioned where such records are supplied to other parallel port output interfaces. The control byte holds the information as to which data lanes are valid. Compressor 180 compresses invalid data lanes out of the data stream. Timestamps are injected periodically. It should be appreciated that while TCB 170 is a circular buffer, streaming of its contents to DisplayPort interface 190 allows the data to be captured through interface 190 rather than being lost due to expiration via the circular buffer.

The first two 64-bit quadwords of a TCB record are not directly output but rather are processed to form the timestamp. Timestamps are injected only at TCB record boundaries, but need not be aligned on 64-bit boundaries. These timestamps are inserted periodically. In addition to the periodic timestamps, additional timestamps are inserted when a data loss flag is observed in the first 64-bit quadword of the TCB record.

Data is sent to the Displayport interface 190 from UNB 140 (via debug bus 150, debug state machine 160, trace capture buffer 170) sixty-four bits at a time. This rate is configurable and the rate at which data is sent is controlled via a streaming data control register within UNB 140. The Displayport handles packetizing, cyclic redundancy check generation, and all protocols necessary to achieve a desired bit error rate.

In this manner, a stream of performance data is provided to a parallel port readily accessible to a user. Additionally, such performance data need not drive an interrupt to any of the processors 110, 120, 130 to become accessible to a user. Stated differently, data regarding performance is output while the monitored processor is executing the instructions being monitored. This monitoring is done without interrupting the operation being monitored, block 520.

To then capture the data for analysis, data capture device 195 is coupled to displayport output 190. Data capture device 195 includes parallel port 198 suitable to receive the data stream 280 supplied by displayport output 190. Data capture device 195 further has hardware (such as performance data extractor 196) and/or software thereon to parse the stream and extract the performance data therefore. The performance data is further able to be stored (either before or after being extracted).

The software operations described herein can be implemented in hardware such as discrete logic fixed function circuits including but not limited to state machines, field programmable gate arrays, application-specific circuits or other suitable hardware. The hardware may be represented in executable code stored in non-transitory memory such as RAM, ROM or other suitable memory in hardware descriptor languages such as, but not limited to, RTL and VHDL or any other suitable format. The executable code when executed may cause an integrated fabrication system to fabricate an IC with the operations described herein.

Also, integrated circuit design systems/integrated fabrication systems (e.g., work stations including, as known in the art, one or more processors, associated memory in communication via one or more buses or other suitable interconnect and other known peripherals) are known that create wafers with integrated circuits based on executable instructions stored on a computer-readable medium such as, but not limited to, CDROM, RAM, other forms of ROM, hard drives, distributed memory, etc. The instructions may be represented by any suitable language such as, but not limited to, hardware descriptor language (HDL), Verilog or other suitable language. As such, the logic, circuits, and structure described herein may also be produced as integrated circuits by such systems using the computer-readable medium with instructions stored therein. For example, an integrated circuit with the aforedescribed software, logic and structure may be created using such integrated circuit fabrication systems. In such a system, the computer readable medium stores instructions executable by one or more integrated circuit design systems that cause the one or more integrated circuit design systems to produce an integrated circuit.

The above detailed description and the examples described therein have been presented for the purposes of illustration and description only and not for limitation. For example, the operations described may be done in any suitable manner. The method may be done in any suitable order still providing the described operation and results. It is therefore contemplated that the present embodiments cover any and all modifications, variations or equivalents that fall within the spirit and scope of the basic underlying principles disclosed above and claimed herein. Furthermore, while the above description describes hardware in the form of a processor executing code, hardware in the form of a state machine or dedicated logic capable of producing the same effect are also contemplated.

What is claimed is:

1. A method of providing performance information about a plurality of processing devices, the method comprising:
   generating a stream of performance data that is provided in parallel to a stream combiner by the plurality of processing devices whose performance is reflected in the performance data, and
   providing the performance data stream to a parallel port output as it is generated in back-to-back cycles in real-time, and the providing being executed without requiring that an interrupt be generated by any of the devices being monitored.

2. The method of claim 1, wherein the plurality of processing devices includes a first processor that is a graphics processor and a second processor.

3. The method of claim 1, further comprising receiving a plurality of performance monitor signals and wherein generating the stream of performance data includes combining the plurality of signals into a packet.

4. The method of claim 1, wherein providing the performance data stream to the parallel port includes linking a debug bus to the parallel port.

5. The method of claim 1, wherein providing the performance data stream to the parallel port includes streaming data from a trace buffer and providing the performance data stream to the parallel port output.

6. A method of generating a stream of performance monitor data, comprising:
   receiving, by a stream combiner, a plurality of performance monitor signals in parallel from a plurality of processors;
   combining, by a stream combiner, the received performance monitor signals into a packet; and
   outputting, by a stream combiner, the packet for a parallel port as it is generated in back-to-back cycles in real-time without requiring generation of an interrupt to the processors that are being monitored.

7. The method of claim 6, wherein the packet is one of a plurality of like packets that are all streamed to the parallel port.

8. The method of claim 6, wherein the packet is output to the parallel port in parallel with operation of the plurality of processors whose performance is the subject of the performance monitor signals.

9. The method of claim 6, wherein outputting the packet to a parallel port includes linking a debug bus to the parallel port.

10. A method of outputting processor performance information, comprising:
    coupling a debug bus to a parallel port such that performance data provided to the debug bus is continuously streamed in back-to-back cycles in real-time to the parallel port without requiring generation of an interrupt to a plurality of processors that are being monitored, wherein the performance data is generated by providing processor data to a stream combiner in parallel from the plurality of processors.

11. The method of claim 10, wherein streaming the performance data to the parallel port includes streaming data from a trace buffer and providing the stream to the parallel port output.

12. A performance monitoring system, comprising:
    at least one source of system performance data;
    a stream combiner operable to generate performance data that is provided in parallel by the at least one source of system performance data;
    a debug bus operable to receive and transport packets containing the performance data; and
    a parallel port coupled to the debug bus such that data streamed on the debug bus is provided to the parallel port continuously in back-to-back cycles in real-time without requiring generation of an interrupt to a processor that is being monitored.

13. The system of claim 12, wherein the at least one source includes a graphics processing unit and a central processing unit.

14. The system of claim 12, further comprising a trace capture buffer operable to receive performance data via the debug bus and provide the performance data to the parallel port.

15. The system of claim 12, wherein the parallel port operates using the DisplayPort specification.

16. A computer readable medium containing non-transitory instructions thereon, that when interpreted by at least one processor cause the at least one processor to:
    generate a stream of performance data that is provided in parallel to a stream combiner by a plurality of processing devices whose performance is reflected in the performance data, and
    provide the performance data stream to a parallel port output as it is generated in back-to-back cycles in real-time, and the providing being executed without requiring that an interrupt be generated by any of the devices being monitored.

17. The computer readable medium of claim 16, wherein the instructions are embodied in hardware description language suitable for one or more of describing, designing, organizing, fabricating, or verifying hardware.

18. A data capture device, comprising:
    a parallel port input operable to continuously receive data streamed from a parallel port of a computing device as it is generated in back-to-back cycles in real-time and without requiring generation of an interrupt to a plurality of processors that are being monitored, wherein the streamed data is generated by providing processor data to a stream combiner in parallel from the plurality of processors; and
    a performance data extractor operable to extract performance data from a data stream received via the parallel port input.

19. A method of outputting processor performance data, comprising:
    executing a set of instructions on a plurality of processors;
    monitoring the operation of the processors as the instructions are executed;
    outputting, by a stream combiner, a stream of data regarding the performance of the processors as it is generated in back-to-back cycles in real-time by providing the data in parallel from the plurality of processors while the instructions are being executed; wherein the outputting allows the processors to continuously execute the instructions during the outputting without requiring generation of an interrupt to the processors that are being monitored.

20. The computer readable medium of claim 16, wherein the performance data stream is provided to the parallel port using a debug bus linked to the parallel port.

21. The data capture device of claim 18, wherein the streamed data is provided using a debug bus linked to the parallel port of the computing device.

22. The method of claim 19, wherein the stream of data is outputted to a parallel port using a debug bus linked to the parallel port.

* * * * *